W. J. BEISEL.
SPRING WHEEL.
APPLICATION FILED MAY 20, 1918.
1,378,516.
Patented May 17, 1921.
3 SHEETS—SHEET 1.
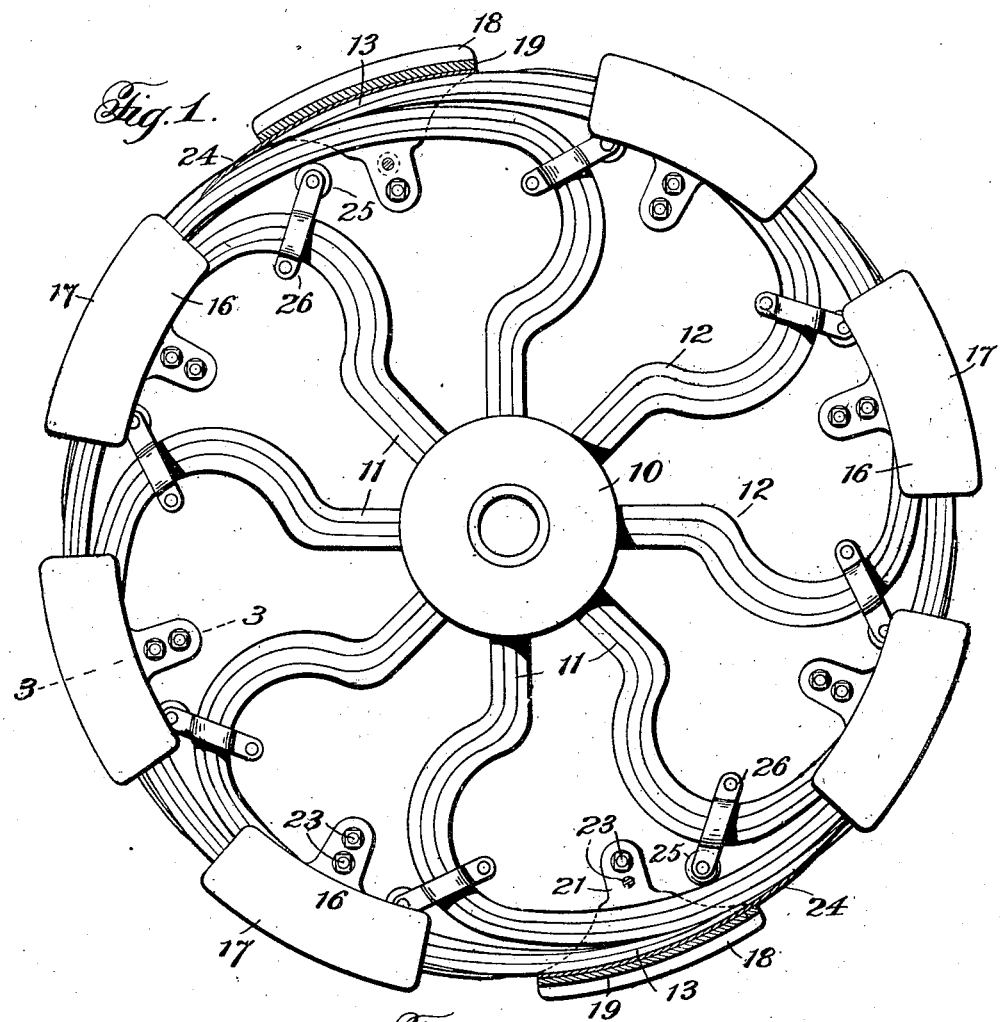
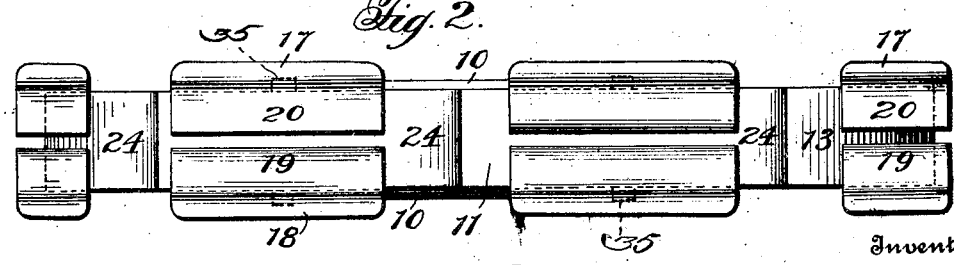

W. J. BEISEL.
SPRING WHEEL.
APPLICATION FILED MAY 20, 1918.
1,378,516.
Patented May 17, 1921.
3 SHEETS—SHEET 2.
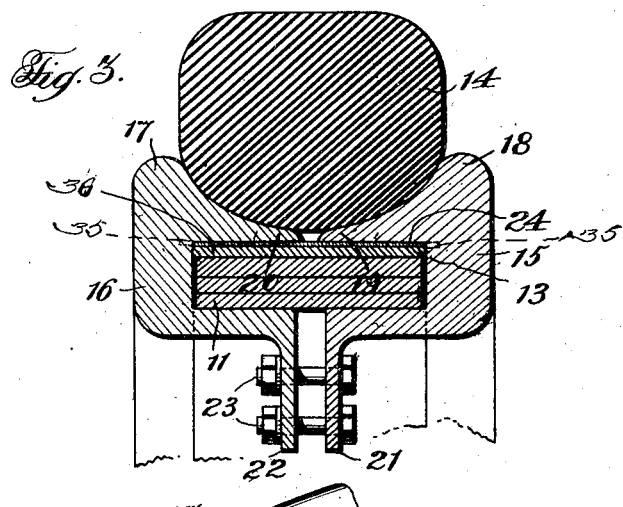
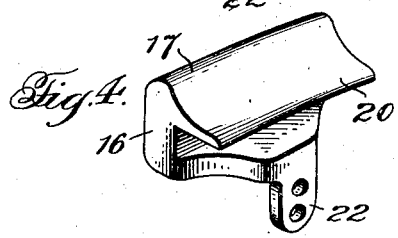
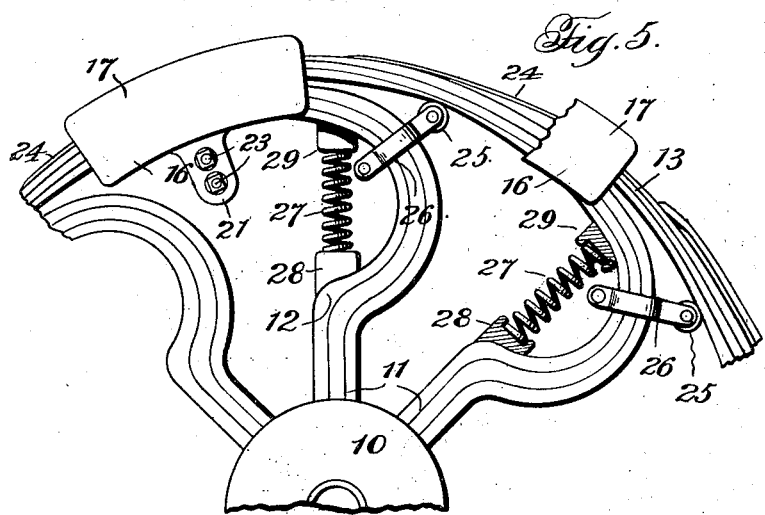

W. J. BEISEL.
SPRING WHEEL.
APPLICATION FILED MAY 20, 1918.
1,378,516.
Patented May 17, 1921.
3 SHEETS—SHEET 3.
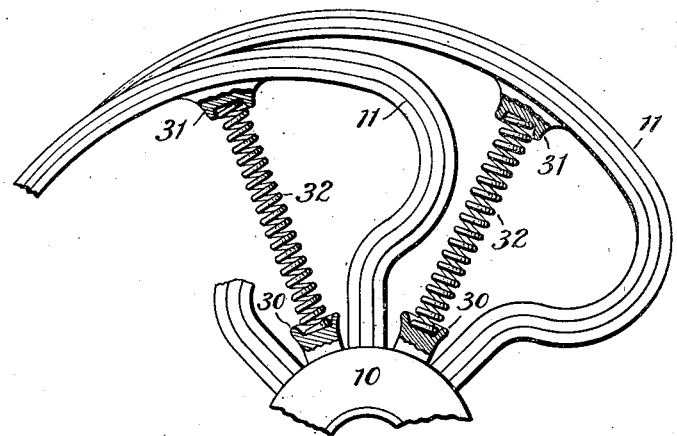
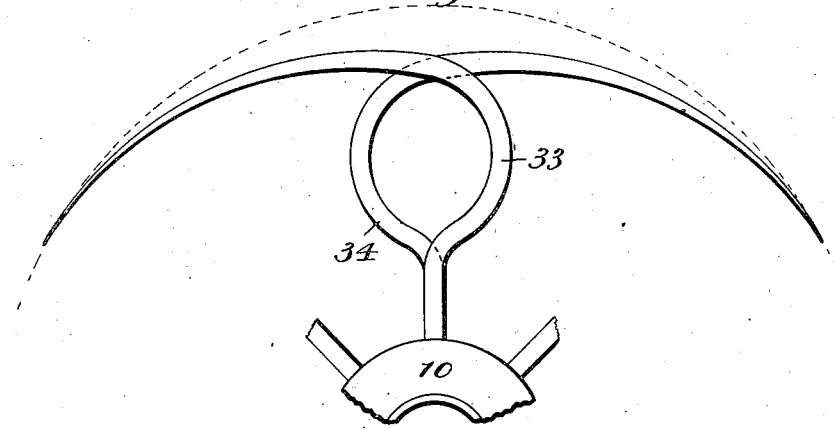
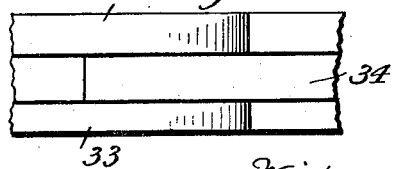

UNITED STATES PATENT OFFICE.

WILLIAM J. BEISEL, OF BROOKLYN, NEW YORK.

SPRING-WHEEL. REISSUED

1,378,516. Specification of Letters Patent. Patented May 17, 1921.

Application filed May 20, 1918. Serial No. 235,681.

*To all whom it may concern:*

Be it known that I, WILLIAM J. BEISEL, a citizen of the United States, and residing at Brooklyn, Kings county, State of New York, have invented certain new and useful Improvements in Spring-Wheels, of which the following is a specification.

This invention relates to spring wheels to be used on various vehicles but is particularly adapted for use on motor vehicles. The wheel embodying the invention is intended to secure practically the resilient and yielding effect of a pneumatic tire without using such tire. It embodies a construction by which the wheel may yield locally at the rim when striking a comparatively small obstacle, much as a pneumatic tire does without causing objectionable movement of the rim or wheel as a whole. It includes other novel features of construction making up a strong, simple and efficient wheel which has an attractive appearance. The novel features will be apparent from the following description taken in connection with the drawings.

In the drawings:

Figure 1 is a side view of a wheel embodying my invention with the tire removed;

Fig. 2 is an edge view of the wheel;

Fig. 3 is a cross section on the line 3—3 of Fig. 1, a tire being shown in position;

Fig. 4 is a perspective view of one of the retaining members for the tire; and

Fig. 5 is a side view of a wheel showing a modification;

Fig. 6 is a detail view showing a modified arrangement of supplemental coil spring;

Fig. 7 is a detail side view of a modified form of wheel embodying the broad principles of my invention but including spokes bent in opposite directions; and Fig. 8 is an edge view of the rim embodying this modified construction.

As shown in Fig. 1 the wheel embodies a central hub 10 which may be of the construction disclosed in another application filed by me on May 20, 1918, Serial Number 235,682, and secured to this hub there is a series of spokes 11, which extend radially. These spokes are made in the form of a series of superposed plates, flat in cross section, constituting what is known as a leaf spring. While the inner ends of the spokes are radial, there is a bend in each spoke at the point 12 near the hub and the outer end of the spoke is curved first to the right and then on a gradual curve to the left forming an outer tapered end 13. The outer portion of each spoke is curved to conform to a circle and the end of one spoke rests upon and partially laps the next spoke, all of the points of the spokes extending in the same direction. Since each spoke tapers gradually to its point, the outer surface of all of the spokes combined constitutes a complete circle or rim for the wheel. It will be seen, however, that this rim is made up of a series of sections and each section may move in reference to the next section both inwardly or radially and circumferentially. In this movement the end of one section slides on the next section but the substantial continuity of the circular rim is not broken. By this arrangement, where the wheel strikes an obstruction, the particular section of the rim which comes in contact with it may yield without causing any appreciable movement of those portions of the rim at other parts of the circumference. There will be some movement of the small adjacent sections, but practically the result will be a local yielding of the rim surface just as a pneumatic tire locally yields without affecting other portions of its surface.

It will be observed that each spring is made up of a number of superposed leaves of different lengths making a laminated construction as in the usual leaf spring. While each spring constituting a spoke has a straight section extending radially from the hub there is at a point not far from the hub a bend or curve in it in the plane of the wheel and then a reverse curve or bend which brings it back across the radial line from that part in next to the hub and from that point on the radius of the curve gets gradually greater to the end of the spoke. This produces a spring of special form having exceptional resiliency at its outer end.

I preferably use on the yielding rim of my wheel a solid rubber tire 14, shown in Fig. 3. In order to properly hold that tire in place, I make use of the tire retaining members 15, 16 which fit against the outer portion of the spring spokes and which are clamped to them. These retaining members are, of course, made in the form of a segment of a circle with ribs or projections 17, 18 on the margin to hold the tire against side movement. They are also preferably provided with the tapering lips 19, 20 which extend over the outer periphery of the rim in toward each other, thus furnishing some support for the tire. The inner portions of the retaining members have lips or flanges 21, 22 through which bolts 23 pass to clamp each pair of retaining members together on the wheel rim.

As will be seen by reference to Fig. 1, these retaining members do not constitute together a complete circle, but there is a break between adjacent pairs and this is to allow for the movement of the wheel rim, as heretofore indicated. In order to prevent the overlapping ends of the adjacent spokes from chafing the inner surface of the tire, I may make use of a thin metal plate extending around the rim lapping the joints between adjacent spokes. In Fig. 1 such a plate marked 24 is shown secured to the parts marked 15, 16 of the tire retaining clamps. A plate 24 is, in this instance, secured to each pair of clamps and covers the joint in the rim at that point.

In order that there shall be proper relative longitudinal or peripheral movement of the lapping ends of adjacent spokes and the leaves of the same spokes within the clamping members 15 and 16, one layer or leaf of each spoke is made somewhat wider where it enters the last of the two pairs of clamps through which it passes than at other points and than the other layers or spokes at that point whereby its side margins will be gripped and held by the inner side faces of the clamping members 15 and 16 so that the said layer or leaf and clamps will move together permitting free longitudinal movement of the other layers in reference to them. This is shown in Fig. 3 where for purposes of illustration the outer layer or leaf marked 36 of outer spokes 13 is wider than the other leaves of this spoke and than the leaves of the inner spring spoke 11. It will be understood, however, that the invention is not limited to clamping the outer layer as distinguished from the inner layer. The plate 24 is detachably connected to the clamping members so as to move therewith by side ears or projections 35 fitting in corresponding side sockets in the inner faces of the clamping members 15 and 16 as shown in dotted lines in Figs. 2 and 3.

In order to facilitate the movement of a section of one spoke on the next spoke, I preferably make use of an anti-friction roller 25 bearing against the inner surface of one spoke and carried from the next spoke by a clamp 26. For certain purposes, and where particularly heavy loads are to be carried, it may be advisable to reinforce the spring spokes and this may of course, be done in various ways. In Fig. 5 I have shown one means for reinforcing the spokes which includes the coil spring 27 resting in a socket 28 at the bend in the spring spoke and its other end resting in the socket 29 in the inner surface of the outer curved end of the spoke.

In Fig. 6 there is shown a modified construction for reinforcing the leaf spring 11. In this instance the reinforcing means embodies a socket 30 secured to the hub 10 between the spokes and a socket 31 secured to the inner face of the spring at its outer portion, together with the coiled spring 32 fitting in these sockets. This spring may, of course, be made of the proper strength to suit the particular use to which the wheel is to be put.

In Fig. 7 there is shown a specifically different application of the broad idea embodied in my leaf spring. In this instance, instead of having a single spring sufficiently wide to extend across and form the rim, three separate springs are used, the two outer springs facing in one direction and the inner spring facing in the opposite direction. As shown in Figs. 7 and 8 the outer springs are marked 33 and the inner spring 34 and each spring is of the same general construction as the leaf spring illustrated in Fig. 1. These springs are thus arranged three in a series, the outer springs curving in one direction and the inner spring curving in the opposite direction, and this will result in a crossing of the springs between the hub and the periphery. It will, of course, be understood that a sufficent number of outer springs 33 are used to overlap each other and form a complete circle as in Fig. 1 and this is true also of the inner springs 34. In this construction, therefore, the outer rim of the wheel will include marginal parts movable in one direction, whereas the center part will be movable in the opposite direction. Ordinarily the outer spring sections 33 will be made of the same width as the inner spring section 34.

Having thus described my invention what is claimed as new and desired to be secured by Letters Patent is:

1. A spring wheel for vehicles comprising a hub and a series of leaf spring spokes secured thereto having radial inner portions and being bent in the plane of the wheel at points uniform distances from the hub and the outer portions from that point being bent on a gradual curve until they pass back across the radial lines of the inner portions with the outer ends tapering in thickness and the radius of the curve gradually increasing until the tip ends of adjacent spokes rest on each other forming a practically continuous circular rim and adapted to move radially and circumferentially on each other without breaking the continuity of the rim.

2. A spring wheel for vehicles comprising a hub and a series of leaf spring spokes secured thereto having radial inner portions and being bent in the plane of the wheel at a sharp angle at points uniform distances from the hub and the outer portions from that point outwardly being bent on a gradual curve until they pass back across the radial lines of the inner portions with the outer ends tapering in thickness with the outer leaf of each spoke longest and the radius of the curve gradually increasing until the tip ends of adjacent spokes rest on each other forming a practically continuous circular rim and adapted to move radially and circumferentially on each other without breaking the continuity of the rim and tire retaining members clamped to said spokes near their outer ends and projecting beyond the margin of said rim to hold a tire in place without interferring with the relative longitudinal and radial movement.

3. A spring wheel for vehicles comprising a hub and a series of leaf spring spokes secured thereto having radial inner portions and being bent in the plane of the wheel at points uniform distances from the hub and the outer portions from that point being bent on a gradual substantially uniform curve until they pass back across the radial lines of the inner portions with the outer ends tapering in thickness and the radius of the curve gradually increasing until the tip ends of adjacent spokes rest on each other forming a practically continuous circular rim and adapted to move radially and circumferentially on each other without breaking the continuity of the rim and antifriction bearings between the spokes near their outer tip ends.

4. A spring wheel for vehicles comprising a hub and a series of spokes secured thereto, the spokes being in the form of leaf springs tapered at their outer ends and similarly curved at their outer ends so as to fit on each other and form together an elastic but practically continuous circular outer rim, a rubber tire on said rim, and tire retaining members clamped to said spokes near their outer ends and projecting beyond the margin of said rim to hold said tire in place, and thin plates carried by said retaining members beneath the tire fitting said rim closely and lapping the joints between the ends of adjacent springs.

5. A spring wheel for vehicles comprising a hub and a series of spokes secured thereto, the spokes being in the form of leaf springs tapered at their outer ends and similarly curved at their outer ends so as to fit on each other and form together an elastic but practically continuous circular outer rim and antifriction rollers between adjacent springs near their outer ends where they approach each other.

6. A spring wheel for vehicles comprising a hub and a series of spokes secured thereto radially, the spokes being in the form of laminated leaf springs tapered gradually to a thin edge at their outer ends, the said spokes being bent or curved between their ends in one direction in the plane of the wheel and the outer ends beyond said first mentioned bend being reversely curved or bent in the plane of the wheel on an arc of large radius whereby the outer ends of said spokes will lie in a circle with the hub as the center, the portion of said spokes between said first mentioned bend and hub being straight and radial.

7. A spring wheel for vehicles comprising a hub and a series of spokes secured thereto radially, the spokes being in the form of laminated leaf springs tapered gradually to a thin edge at their outer ends, the said spokes being bent or curved between their ends in one direction in the plane of the wheel and the outer ends beyond said first mentioned bend being reversely curved or bent in the plane of the wheel on an arc of gradually increasing radius, the outer end of each spring extending across and considerably beyond a radial line from that part of it secured to the hub and there fitting on and lapping the adjacent spoke.

In testimony whereof I affix my signature.

WILLIAM J. BEISEL.